United States Patent Office 3,200,141
Patented Aug. 10, 1965

3,200,141
PROCESS FOR THE MANUFACTURE OF
ACRYLONITRILE
Ernest C. Milberger, Maple Heights, Ohio, assignor to The Standard Oil Company, Cleveland, Ohio, a corporation of Ohio
No Drawing. Filed May 27, 1963, Ser. No. 283,617
3 Claims. (Cl. 260—465.3)

This is a continuation-in-part of my copending U.S. patent application, Serial No. 104,255, filed April 20, 1961, and now abandoned.

The present invention relates to a process for the manufacture of an alpha, beta-olefinically unsaturated nitrile involving the catalytic reaction of a mixture comprising an alpha-olefin, such as propylene, ammonia and oxygen. More particularly, this invention is concerned with an improvement in such a process which makes possible extended commercial plant runs at uniformly high levels of conversion of olefin to nitrile.

It is known from U.S. Patent No. 2,904,580 to Idol, that acrylonitrile may be produced by contacting a mixture comprising propylene, ammonia and oxygen with a catalyst at an elevated temperature in the range of 550 to 1000° F. and preferably at a temperature of from about 800 to 950° F. Steam may also be added to the reaction mixture, if desired. The process of the present invention represents a novel and unobvious modified version of the process disclosed in the aforementioned patent. In a less preferred embodiment the present process also represents a novel and unobvious improvement over the process disclosed in British Patent No. 874,593 wherein acrylonitrile is produced by reaction of propylene, ammonia and oxygen in the presence of a catalyst.

The pressure at which the reaction is conducted is also an important variable, and the reaction should be carried out at atmospheric or slightly above atmospheric (2 to 3 atmospheres) pressure. In general, high pressures, i.e., above 250 p.s.i.g., are not suitable for the process since higher pressures tend to favor the formation of undesirable by-products.

The apparent contact time employed in the process is not especially critical, and contact times in the range of 0.1 to 50 seconds may be employed. A contact time of 1 to 15 seconds is preferred.

According to the Idol patent, the catalysts which are useful in the process are selected from the group consisting of bismuth, tin and antimony salts of phosphomolybdic and molybdic acids and bismuth phosphotungstate. This patent also teaches that the molar ratio of oxygen to olefin in the feed may be in the range of 0.5:1 to 3:1 and the preferred ratio is given as about 1:1 to 2:1, while the molar ratio of ammonia to olefin in the feed may be in the range of 0.05:1 to 5:1 and the optimum ratio for the manufacture of acrylonitrile appears to be about 1:1. According to the British Patent No. 874,593 the preferred catalyst for this reaction is cobalt molybdate. Catalysts of the foregoing types including those containing minute amounts of catalyst promoting materials such as the oxides of iron, arsenic, nickel, tellurium and the like are also useful in the present process. The catalysts may if desired be deposited on a support such as silica.

Observations made in extended plant runs on the process of the Idol patent reveal that when the process is conducted at ammonia to propylene ratios of about 1:1 and oxygen to olefin ratios in the range of about 1.5:1 to about 2:1, and occasionally higher and lower ratios than these, the overall conversion of propylene to acrylonitrile will, in some instances, gradually decrease during the run until uneconomic conversions are reached. This gradual decline in the overall conversion of propylene to acrylonitrile cannot be predicted a priori from the particular feed ratio of propylene, ammonia and oxygen selected in any single run. The decline in conversion is believed to be caused by a gradual loss in activity of the catalyst by a mechanism or mechanisms which are not known. A catalyst which exhibits a decline in activity usually can be restored to its original state periodically by contacting it with oxygen at an elevated temperature as suggested in said U.S. Patent No. 2,904,580. However, time spent in regenerating the catalyst is unproductive and, consequently, it obviously would be desirable from the standpoint of economics if such regeneration periods could be minimized or completely eliminated.

It has now been discovered that it is possible to conduct the process of U.S. Patent No. 2,904,580, and less preferably the process of British Patent No. 874,593, in a manner which will permit the continuous production of acrylonitrile for long periods of time, i.e., several months to more than a year, without any apparent decline in the overall conversion of propylene to acrylonitrile and without the necessity for periodic regeneration of the catalyst as disclosed in the aforementioned U.S. patent. This is accomplished in accordance with the present invention by means of a careful selection of the process conditions.

In brief, the process of this invention is carried out by carefully regulating the proportions of ammonia, propylene and oxygen in the feed to the reactor so that the reactor effluent will always comprise a small amount of gaseous molecular oxygen, preferably at least 0.1 mole percent. Higher concentrations of oxygen may be tolerated in the effluent but, in general, no advantage results from a high concentration of oxygen in the reactor effluent gas and a practical upper limit is about 7 mole percent.

The oxygen content of the reactor effluent may be maintained above 0.1 mole percent by periodically measuring the oxygen content of the reactor effluent and adjusting the amount of oxygen in the feed to the reactor in accordance with these measurements. In any event, the relative proportions of propylene, oxygen and ammonia and particularly the relative proportions of propylene and oxygen are regulated in the feed so as to maintain the desired amount of oxygen in the effluent. A number of methods of determining the oxygen content of a gas are known in the art and these methods per se are not a part of the present invention. Thus, when the amount of oxygen in the reactor effluent falls below 0.1 mole percent, it is necessary to effect changes in the ratios of the feed components to the reactor. The most direct way is to simply increase the air rate, which increases the air/propylene mole ratio. The same result may be obtained with a relatively smaller decrease in the propylene rate (with a corresponding decrease in the ammonia rate so as to maintain a constant ammonia/propylene ratio). By this means the air/propylene ratio is increased with much smaller variation in the total volume of feed.

Of course, in the full-scale industrial embodiment of the present acrylonitrile process there are a number of variables, such as temperature and pressure, which will affect the molecular oxygen content of the reactor effluent. Other variables are not readily observable. These include relative catalyst activity values and the efficiency of gas-solids contacting. Therefore, it is necessary to continuously monitor the oxygen content of the reactor effluent in order to provide rapid intelligence concerning a reduction of the oxygen content of the effluent irrespective of the cause. Moreover, if a high degree of automation is desired in the plant, a continuous oxygen analyzer may be employed which will provide a continuous measurement of the oxygen content of the reactor effluent. Several kinds of continuous oxygen analyzers are available commercially. Such a continuous analyzer may be adapted to furnish signals to an automatic control valve which will regulate the relative amount of oxygen in the feed to the reactor in response to the signals. In this manner, the amount of oxygen in the reactor effluent may be maintained at the desired level without dependence on human intervention.

The advantages resulting from the process of this invention will be better understood by a comparison of the data obtained in the examples described below.

EXAMPLE I

This experiment, which illustrates the process of the invention, was conducted in a laboratory reactor employing a fluidized bed of bismuth phosphomolybdate catalyst prepared according to Example I of U.S. Patent No. 2,904,580. The reaction was maintained at a temperature of 850° F. and 13 p.s.i.g. throughout the run, in which the WWH (weight of propylene introduced into reactor per hour divided by the weight of catalyst in the reactor) was maintained constant at 0.03. The feed during the run was uniform and had the following composition:

Ingredient: Mole percent
Air _____ 76.5
Ammonia _____ 7.6
Water _____ 7.6
Propylene _____ 8.4

The results observed in the run are reported in Table I. In Table I as well as in the following examples and tables, the following definition applies:

Percent conversion =

$$\frac{\text{Wt. of propylene converted to acrylonitrile} \times 100}{\text{Wt. of propylene in feed}}$$

Samples were taken periodically as indicated in the table.

Table I

| Time on Stream, Hrs. | Propylene to Acrylonitrile Per Pass, Percent Conversion | Amount of Molecular $O_2$ in Reactor Effluent (Mole Percent) |
| --- | --- | --- |
| 2.0 | 40.3 | 1.1 |
| 4.5 | 39.4 | 0.8 |
| 8.6 | 36.4 | 1.3 |
| 11.1 | 50.7 | 1.7 |

It can be seen from this table that the percent conversion of propylene to acrylonitrile was maintained at a high level with excess oxygen in the effluent. This run was continued without interruption for several months beyond the 11.1 hours shown in Table I, the oxygen in the effluent was monitored and the ratio of air:propylene in the feed was adjusted so that at all times at least 0.1 mole percent of oxygen was present in the effluent and the conversion of propylene to acrylonitrile remained between 40 and 50% during the extended run.

EXAMPLE II

This experiment illustrates a process outside the scope of the present invention. It was conducted in the same apparatus and under the same conditions as in Example I except that the composition of the initial feed was slightly different, there was no oxygen in the effluent, and the feed composition was not adjusted to provide oxygen in the effluent. The feed which had an air:propylene mole ratio of 8:1 had the following composition:

Ingredient: Mole percent
Air _____ 72.7
Ammonia _____ 9.1
Water _____ 9.1
Propylene _____ 9.1

The results are given in Table II.

Table II

| Time on Stream, Hrs. | Percent Conversion | Amount of $O_2$ in Reactor Effluent (Mole Percent) |
| --- | --- | --- |
| 2.3 | 43.5 | 0 |
| 4.8 | 39.2 | 0 |
| 9.5 | 27.4 | 0 |
| 12.8 | 17.9 | 0 |
| 15.2 | 7.5 | 0 |

These data show that when oxygen is absent from the reactor effluent, the percent conversion of propylene to acrylonitrile will decline to low levels in a matter of hours. The catalyst used in the above run was then regenerated by passing only air through the fluid bed reactor for 30 minutes at a temperature of 850–900° F. as suggested in U.S. Patent No. 2,904,580. The spent catalyst which was dark in appearance initially, regained its yellow color upon the foregoing regeneration. Once again, the reaction described above was repeated using the regenerated catalyst and an initial conversion of propylene to acrylonitrile of 50.4% was obtained, but in the absence of oxygen in the effluent and in the absence of any adjustment of the feed ratio to produce oxygen in the effluent, the activity of the catalyst dropped so that in a few hours a conversion of propylene to acrylonitrile of only 1.3% was obtained and a second regeneration of the catalyst was necessary.

EXAMPLE III

The runs listed in Table III were carried out in accordance with the procedure of Example I. The experiments were carried out in a laboratory reactor employing a fluidized bed of finely divided bismuth phosphomolybdate catalyst which was prepared in accordance with Example I of U.S. Patent No. 2,904,580. The feed during the runs had the following composition:

Ingredient: Mole percent
Air _____ Variable
Ammonia _____ 7.6
Water _____ 7.6
Propylene _____ 8.4

The final equilibrium ratio of air to propylene is given for each run in Table III. Each experiment was run for several hours, during this time the effluent gases were continuously analyzed for oxygen with a continuous oxygen analyzer and the feed ratio of air to propylene was continuously adjusted until a nearly constant amount of oxygen (in the range of from 0.1 to 7 mole percent) was observed in the effluent gas. At this point, the reaction had reached substantially equilibrium conditions which are shown in Table III for each experiment.

Table III

| Mole Ratio Air:Propylene | Mole Percent $O_2$ in Effluent | Percent Conversion to Acrylonitrile | Pressure, p.s.i.g. | Temp., °F. |
| --- | --- | --- | --- | --- |
| 4.2 | 1.35 | 49.3 | 20 | 900 |
| 6.8 | 0.87 | 50.9 | 13 | 900 |
| 10.2 | 0.74 | 48.6 | 13 | 850 |
| 11.9 | 0.92 | 45.9 | 20 | 850 |
| 13.2 | 1.45 | 30.6 | 13 | 950 |

In the foregoing experiments it is apparent that the requirements for oxygen varied widely such that the required air:propylene feed ratios ranged in value by a factor of three.

EXAMPLE IV

A reactor, 18 inches in diameter and charged with approximately 500 pounds of a fluidized bed of bismuth phosphomolybdate catalyst prepared according to the procedure of Example I, was operated at a temperature of 850° F. and at a fixed air/propylene ratio equal to 8. As illustrated in Table IV, conversion to acrylonitrile remained fairly steady for some 20 hours, but during the next 20 hour period, conversion to acrylonitrile dropped rapidly. As was the case in Example II, a short air regeneration restored the catalyst activity, but only for a very short time, for conversion again dropped sharply. This period of operation was characterized by the fact that no oxygen was present in the reactor effluent.

After a second regeneration, the run was continued with a arbitrary increase of the air/propylene ratio to 10 in the feed. This was sufficient to provide excess oxygen in the effluent, and conversion was maintained at a level equal to the initial conversion value for a period of some 30 hours.

Table IV

| Air:Propylene Mole Ratio | Time on Stream, Hrs. | Oxygen in Effluent Gas | Change in Per Pass Conversion of Propylene to Acrylonitrile, Percent Conversion Units |
|---|---|---|---|
| 8:1 | 0 | No | 0 |
| | 20 | No | +1 |
| | 42 | No | −20 |
| REGENERATION 48–62 HOURS. AIR ALONE | | | |
| | 62 | No | +7 |
| | 74 | No | −17 |
| REGENERATION 78–86 HOURS. AIR ALONE | | | |
| | 86 | No | +7 |
| | 88 | No | +6 |
| | 100 | No | −2 |
| 10:1 | 128 | Yes | −0.5 |
| | 130 | Yes | 0 |

EXAMPLE V

Following the experiment described in Example IV the same charge of catalyst was run under identical conditions, with the exception that the air/propylene feed ratio was arbitrarily fixed at a value of 9. Results are shown in Table V. Conversion was maintained for 15 hours, after which by 48 hours running the conversion dropped to zero. Apparently, an arbitrary air/propylene ratio of 9 was not sufficient to maintain excess oxygen.

The catalyst was regenerated with air and put back on stream under identical conditions with the exception that the air/propylene ratio was varied continuously so that approximately 4% excess $O_2$ was maintained in the reactor tail gas as indicated by a continuous oxygen analyzer. In some cases, air/propylene ratios as high as 11 were required. The results in Table V show that over a 50-hour on stream time conversion to acrylonitrile was essentially unchanged.

Table V

| Conditions | Time on Stream | Results |
|---|---|---|
| 850° F., Air:Propylene=9. | 0–15 hours | Essentially no change in conversion of propylene to acrylonitrile. |
| Same as above | 15–48 hours | During this interval conversion dropped to zero. |
| CATALYST REGENERATED | | |
| 850° F., Air:Propylene varied to maintain about 4% oxygen in effluent. Air:Propylene mole ratio got as high as 11:1. | 0–50 hours | Conversion of propylene to acrylonitrile essentially unchanged. |

EXAMPLE VI

An experiment in the 18 inch reactor described in Example V filled with a new charge of approximately 500 pounds of bismuth phosphomolybdate catalyst was run under conditions of 850° F. temperature with pressure controlled within a range ±3 p.s.i.g. The air/propylene ratio was adjusted frequently to maintain excess oxygen in the effluent gas in the range from 0.5 to 1.5%. The actual numerical range of the air/propylene mole ratio was between 6.8 and 9. The results are listed in Table VI. As indicated, for a total on stream time of 191 hours, conversion to acrylonitrile was equal to or better than the initial result.

Table VI

| Time on Stream, Hrs. | Air:Propylene Mole Ratio | Change in Conversion of Propylene to Acrylonitrile from Initial Conversion (Percent Conversion Unit Changed) |
|---|---|---|
| 3 | 7.0 | 0 |
| 27 | 7.0 | +4.4 |
| 51 | 6.8 | +6.0 |
| 79 | 6.9 | −1.0 |
| 99 | 6.9 | +1.2 |
| 121 | 7.0 | +3 |
| 145 | 7.7 | +2 |
| 169 | 7.6 | +0.1 |
| 191 | 9.0 | +5.1 |

EXAMPLE VII

The reactor described in Example VI was charged with approximately 500 lbs. of a new, improved, more active charge of bismuth phosphomolybdate catalyst. The conditions were identical to those described in Example VI but because of improved catalyst activity, the air/propylene mole ratio in the feed necessarily ranged at a higher level between the values of 11 and 14.5. Again the feed air/propylene mole ratio was adjusted frequently so as to maintain 0.5 to 1.5 mole percent excess oxygen in the reactor effluent. Results are listed in Table VII. For the initial 85-hour on stream period, during which time the values of the air/propylene ratio varied between the limits of 11 and 14.5, total propylene conversion was essentially complete and the conversion to acrylonitrile was maintained at a uniform high level between 60.7 and 64.4%. During the interval between the 85th and 97th hour on stream time, the catalyst was subjected to 12 hours regeneration using air alone. The run was continued up to 148 hours total under identical conditions and the results were essentially the same as during the first 85-hour run period. This indicated that the catalyst was maintained at its highest state of activity using the expedient of varying air/propylene ratio to maintain excess oxygen in the effluent gas. Deliberate regeneration with air alone did not further enhance the activity of the catalyst.

Reactor conditions were changed somewhat, primarily the propylene feed rate was increased resulting in an increase in the superficial linear velocity in the reactor. During this period between 153 and 191 hours, both total conversion and conversion to acrylonitrile were at a somewhat lower level which was entirely to be expected but the level remained unchanged. During the period from 191 to 203 hours of on stream time, the catalyst was again subjected to a deliberate 12-hour regeneration with air. It was then run for a period of approximately 150 additional hours and consistent high conversion to acrylonitrile was maintained for this period.

Table VII

| Time on Stream, Hrs. | Air:Propylene Mole Ratio | Percent Per Pass Conversion of Propylene to Acrylonitrile |
|---|---|---|
| 20 | 13.6 | 64.4 |
| 25 | 14.5 | 63.6 |
| 45 | 13.3 | 64.0 |
| 60 | 12.1 | 60.5 |
| 75 | 11.0 | 62.5 |
| 85 | 11.0 | 60.7 |
| 85-97 REGENERATED FOR 12 HOURS | | |
| 111 | 12.8 | 60.3 |
| 126 | 13.0 | 60.3 |
| 141 | 13.4 | 60.6 |
| 148 | 10.0 | 61.8 |
| LINEAR VELOCITY INCREASED (greater propylene feed) | | |
| 153 | 11.1 | 57.8 |
| 166 | 9.4 | 58.7 |
| 181 | 12.3 | 54.6 |
| 191 | 12.3 | 56.5 |
| 191-203 REGENERATED FOR 12 HOURS | | |
| 205 | 12.7 | 59.0 |
| 225 | 11.8 | 61.2 |
| 351 | 11.2 | 60.6 |

EXAMPLE VIII

Table VIII lists the experience of a reactor similar to those described in the previous examples over a period of approximately one year. During this period, reactor temperature was maintained at a fairly uniform level with a total variation of approximately 20° F. Reactor pressure varied over a 13 p.s.i.g. range. Ammonia/propylene ratio was maintained at a fixed value ± approximately 0.05. Oxygen in the effluent was maintained between the levels of 1 and 3 mole percent as indicated by a continuous oxygen analyzer, and the air/propylene ratio varied between the limits of 9 and 12.

The data in Table VIII over a period of 346 days exhibits uniform conversion to acrylonitrile with a deviation of approximately ±3 conversion units of the initial value.

Table VIII

| Days on Stream | Mole Percent $O_2$ in Effluent | Air: Propylene Mole Ratio | Change in Conversion Units, Propylene to Acrylonitrile |
|---|---|---|---|
| 0 | 2.5 | 10.7 | 0 |
| 21 | 2.1 | 10.6 | −0.3 |
| 31 | 2.4 | 10.5 | +3 |
| 56 | 1.2 | 9.9 | −3 |
| 78 | 1.2 | 9.2 | −0.6 |
| 89 | 2.7 | 10.5 | −0.1 |
| 100 | 2.1 | 10.6 | +1.6 |
| 129 | 2.5 | 12.0 | +1.8 |
| 164 | 2.6 | 10.4 | −0.8 |
| 198 | 2.5 | 10.8 | −3.7 |
| 307 | 2.6 | 11.5 | −2.9 |
| 322 | 2.2 | 12.1 | +1.6 |
| 344 | 2.7 | 11.7 | −1.0 |
| 346 | 2.4 | 11.8 | +3.2 |

It will be apparent from the foregoing examples that the present invention provides a process which may be operated over long periods of time at high conversion with little, if any, decline in catalyst activity. Accordingly, this application for Letters Patent is intended to cover all variations and modifications of the process described herein which would reasonably fall within the scope of the appended claims.

I claim:

1. A catalytic process for the continuous manufacture of acrylonitrile which can be carried out for long periods of time without any apparent loss of catalyst activity and without any apparent decline in the production of acrylonitrile consisting of the steps of continuously reacting a gaseous mixture comprising propylene, ammonia and oxygen in the presence of a catalyst selected from the group consisting of bismuth, tin and antimony salts of phosphomolybdic and molybdic acids, bismuth phosphotungstate and cobalt molybdate at an elevated temperature; continuously maintaining the activity of said catalyst by continuously measuring the oxygen content of the effluent from said reaction and continuously adjusting the relative proportion of oxygen introduced into said reaction in accordance with said oxygen measurements so as to maintain the oxygen content of the reaction effluent at least 0.1 mole percent and not over 7 mole percent.

2. A catalytic process for the continuous manufacture of acrylonitrile which can be carried out for long periods of time without any apparent loss of catalyst activity and without any apparent decline in the production of acrylonitrile consisting of the steps of continuously reacting a gaseous mixture comprising propylene, ammonia and oxygen in the presence of a bismuth phosphomolybdate catalyst at an elevated temperature; continuously maintaining the activity of said catalyst by continuously measuring the oxygen content of the effluent from said reaction and continuously adjusting the relative proportion of oxygen introduced into said reaction in accordance with said oxygen measurements so as to maintain the oxygen content of the reaction effluent at least 0.1 mole percent and not more than 7 mole percent.

3. A catalytic process for the continuous manufacture of acrylonitrile which can be carried out for long periods of time without any apparent loss of catalyst activity and without any apparent decline in the production of acrylonitrile consisting of the steps of continuously reacting a gaseous mixture consisting of propylene, ammonia, air and water in the presence of a bismuth phosphomolybdate catalyst at an elevated temperature, continuously maintaining the activity of said catalyst by continuously measuring the oxygen content of the effluent from said reaction and continuously adjusting the relative proportion of oxygen introduced into said reaction in accordance with said oxygen measurements so as to maintain the oxygen content of the reaction effluent from about 0.5 to 4 mole percent.

References Cited by the Examiner

UNITED STATES PATENTS 2,904,580   9/59   Idol _____ 260—465.3

CHARLES B. PARKER, *Primary Examiner.*